United States Patent
Low et al.

(10) Patent No.: US 7,903,384 B2
(45) Date of Patent: Mar. 8, 2011

(54) GROUND DETECTION CIRCUIT FOR VIDEO SIGNAL DRIVER TO PREVENT LARGE CLAMP TRANSISTOR CURRENT

(75) Inventors: Wee Siong Low, Singapore (SG); Jun Chao Tan, Singapore (SG); Yoshinori Ishikawa, Kyoto (JP)

(73) Assignees: Panasonic Corporation, Osaka (JP); Panasonic Semiconductor Asia Pte. Ltd., Singapore (SG)

( * ) Notice: Subject to any disclaimer, the term of this patent is extended or adjusted under 35 U.S.C. 154(b) by 190 days.

(21) Appl. No.: 12/325,073

(22) Filed: Nov. 28, 2008

(65) Prior Publication Data

US 2010/0134698 A1 Jun. 3, 2010

(51) Int. Cl.
*H02H 9/00* (2006.01)
(52) U.S. Cl. .................................... 361/212; 361/56
(58) Field of Classification Search .......... 361/56, 361/212, 91.1
See application file for complete search history.

(56) References Cited

U.S. PATENT DOCUMENTS

| | | | | |
|---|---|---|---|---|
| 4,412,253 A * | 10/1983 | Oguino | ......................... | 348/623 |
| 4,825,294 A * | 4/1989 | Johnson | ......................... | 348/380 |
| 5,216,335 A * | 6/1993 | Lee | ................................ | 315/383 |
| 2004/0021796 A1* | 2/2004 | Fang et al. | .................... | 348/694 |
| 2004/0169980 A1 | 9/2004 | Amano et al. | | |
| 2005/0275756 A1* | 12/2005 | Miura | ......................... | 348/572 |
| 2009/0080134 A1* | 3/2009 | Kang | ......................... | 361/212 |

* cited by examiner

*Primary Examiner* — Danny Nguyen
(74) *Attorney, Agent, or Firm* — Greenblum & Bernstein, P.L.C.

(57) ABSTRACT

A large current flowing out from video signal line driver is prevented whenever the video signal line is being grounded. The system includes a video signal line driver circuit transmitting video signal at pre-determined DC level, a large current prevention circuit detecting video signal line being shorted to ground and cut-off excessive current source out from video signal line driver circuit into video signal line, a start-up time enhancement circuit improving start-up time of ground detection circuit so that system start-up time is not limited by large current prevention circuit, and a switching threshold control circuit setting the switching threshold of large current prevention circuit and start-up time enhancement circuit.

11 Claims, 6 Drawing Sheets

GROUND DETECTION CIRCUIT FOR VIDEO SIGNAL DRIVER TO PREVENT LARGE CLAMP TRANSISTOR CURRENT

BACKGROUND OF THE INVENTION

The present invention relates to a method for preventing large current flowing out from video signal line driver into video signal line, when video signal line is shorted to ground.

In general, video signal is connected to IC through AC coupling capacitor. A video signal line driver circuit will transmit the video signal at a pre-determined DC level. One of the ways to implement the video signal line driver is shown in FIG. 1.

Referring to FIG. 1, video source 8 is connected to video signal line 10 through AC coupling capacitor 9. A typical video signal line driver circuit comprises transistors 1, 2, 3, 4 and current sources 5 and 6. Current source 5 and transistors 1 and 2 form a level shifter circuit so that voltage level at the base of transistor 3 is 2Vbe above bias voltage 7. Function of transistor 3 and current source 6 is to provide sufficient base current for transistor 4. Transistor 4 is a large NPN to provide sufficient current drive to transmit video signal along video signal line 10 at a pre-determined DC level. The pre-determined DC level for this case is: (bias voltage 7+Veb of transistor 1+Vbe of transistor 2−Vbe of transistor 3−Vbe of transistor 4).

FIG. 2 shows an example of a problem that may exist in video signal line driver shown in FIG. 1. The problem arises as a result of the need to ground unused video signal lines. This is because of unused video signal line is not allowed to be left unconnected or 'float' as it will collect noise and affect performance of the video system. However, as a result of this measure, transistor 4 will source out large current when video signal line 9 is shorted to ground terminal 11.

An alternative solution would be to short unused video signal line in video system to ground via an external capacitor. However, this results in additional hardware cost being spent on grounding unused video signal lines.

The present invention is created to solve this problem.

SUMMARY OF THE INVENTION

The purpose of this invention is to provide a method to prevent large current source out from video signal line driver whenever the video signal line is being grounded.

According to present invention, a system for preventing large current flowing out from video signal line driver into video signal line, when video signal line is shorted to ground, the system comprising:

Video signal line driver circuit, to transmit video signal at a first pre-determined DC level;

Large current prevention circuit, to detect video signal line being shorted to ground and cut-off excessive current source out from video signal line driver circuit into video signal line;

Start-up time enhancement circuit, to improve start-up time of ground detection circuit so that system start-up time is not limited by large current prevention circuit;

Switching threshold control circuit, to set the switching threshold of large current prevention circuit and start-up time enhancement circuit.

According to present invention, switching threshold control circuit will output a second pre-determined DC level and large current prevention circuit and start-up time enhancement circuit.

According to present invention, the said second pre-determined DC level will control the said switching threshold of large current prevention circuit and start-up time enhancement circuit.

According to present invention, large current prevention circuit includes a single transistor or plurality of transistors, which will detect the DC level at video signal line.

According to present invention, if DC level at video signal line detected by said large current prevention circuit is lower than said switching threshold, said large current prevention circuit will cut-off the transistor which supplies the current drive to video signal line to transmit video signal at said first pre-determined DC level.

According to present invention, switching threshold of said large current prevention circuit is designed higher than the level of ground noise and lower than the minimum instantaneous voltage level at video signal line when connected to video signal through AC coupling capacitor.

According to present invention, start-up time enhancement circuit includes a single transistor or plurality of transistors which will supply additional current to charge up the AC coupling capacitor during initial start up.

According to present invention, start-up time enhancement circuit will supply additional current until voltage level at video signal line exceed switching threshold of start-up time enhancement circuit.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

The following description explains the best mode embodiment of the present invention.

First Embodiment

Figure 3:
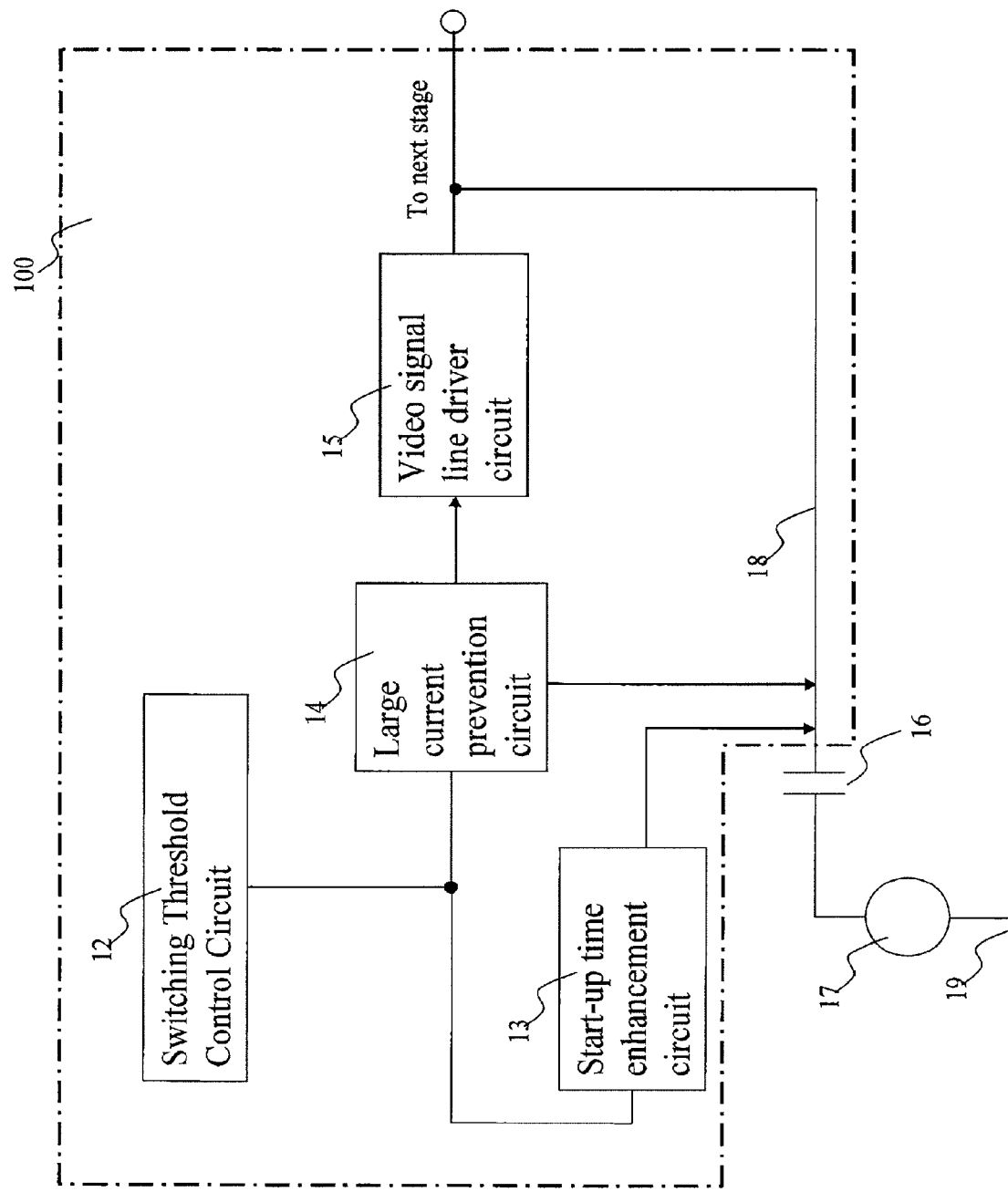
FIG. 3 is the system configuration of this invention according to first embodiment.

Referring to FIG. 3, a first embodiment of a system configuration of ground detection circuit for video signal line driver according to the present invention is shown.

The ground detection circuit 100 for video signal driver has a switching threshold control circuit 12, start-up time enhancement circuit 13, large current prevention circuit 14 and video signal line driver circuit 15.

Figure 1:
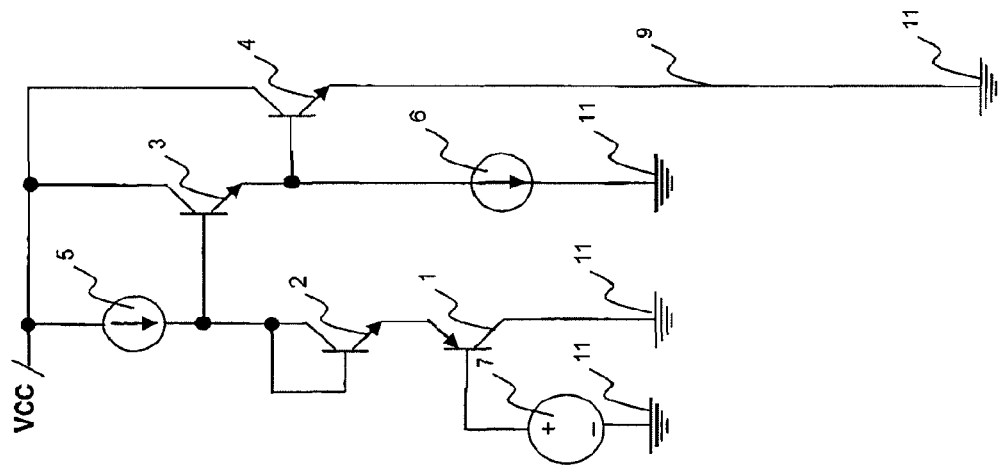
FIG. 1 is a conventional video signal line driver circuit.
Figure 2:
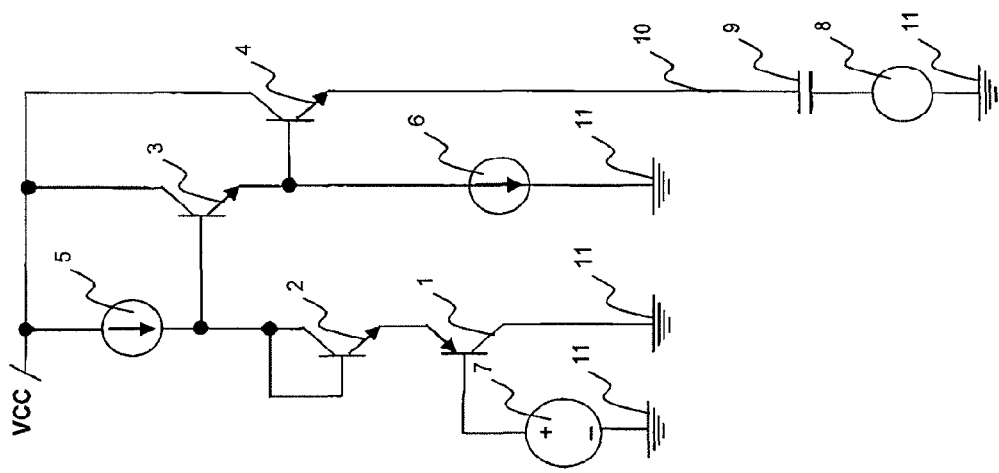
FIG. 2 is showing problem may exist in conventional video signal line driver circuit.

Video source 17 is connected to video signal line 18 through AC coupling capacitor 16. Video signal line driver circuit 15 is a circuit used for transmitting video signal along video signal line and setting a pre-determined DC level for video source 17 to ride on. In conventional design shown in FIG. 2, if video signal line 9 is being shorted to ground terminal 11, video signal line driver circuit 15 shown in FIG. 3 will source large current into the video signal line 18.

Referring to FIG. 3, the ground detection circuit 100 proposed in this invention has such system configuration, such that, when video signal line 18 is shorted to ground terminal 19, the large current flow out from video signal line driver circuit 15 into the video signal line 18 can be cut off.

Referring to FIG. 3, large current prevention circuit 14 will detect if video signal line 18 is shorted to ground terminal 19 and therefore cut-off the large current flowing out from video signal line driver circuit 15 into video signal line 18.

During initial start up of ground detection circuit 100, DC level at video signal line 18 maybe close to ground level. It is equivalent to video signal line 18 short to ground terminal 19. Hence, possible current flowing out from video signal line driver circuit 15 into video signal line 18 will be cut off by the large current prevention circuit 14. For a case where such an undesirable situation as described above occurs, it is desirable to have a fast start-up time. Therefore, start-up time enhancement circuit 13 is added into ground detection circuit shown in FIG. 3 to keep fast start up time as a measure to counter the undesirable situation above.

Referring to FIG. 3, switching threshold control circuit 12 sets the switching threshold of large current prevention circuit 14 and start-up time enhancement circuit 13. The switching threshold of the large current prevention circuit 14 determines when to cut-off potential large current flowing out from video signal line driver circuit 15 to video signal line 18. The switching threshold of the start-up time enhancement circuit 13 determines when it will take the appropriate remedial action to enhance start-up time as mentioned in the previous paragraph.

The present invention depends on self sensing and auto cut-off of possible large current flowing out from video signal line driver circuit 15 whenever video signal line 18 is being connected to ground terminal 19. This has the extra advantage of not needing any external control for this invention.

If present invention is used in video systems, the unused video signal line 18 in video system is allowed to directly connect to ground terminal 19 without using external capacitor. In this case, no additional hardware cost will be spent on unused video signal lines. In addition, there is also no large current flowing out from video signal line driver circuit 15 into video signal line 18.

Second Embodiment

Figure 4:
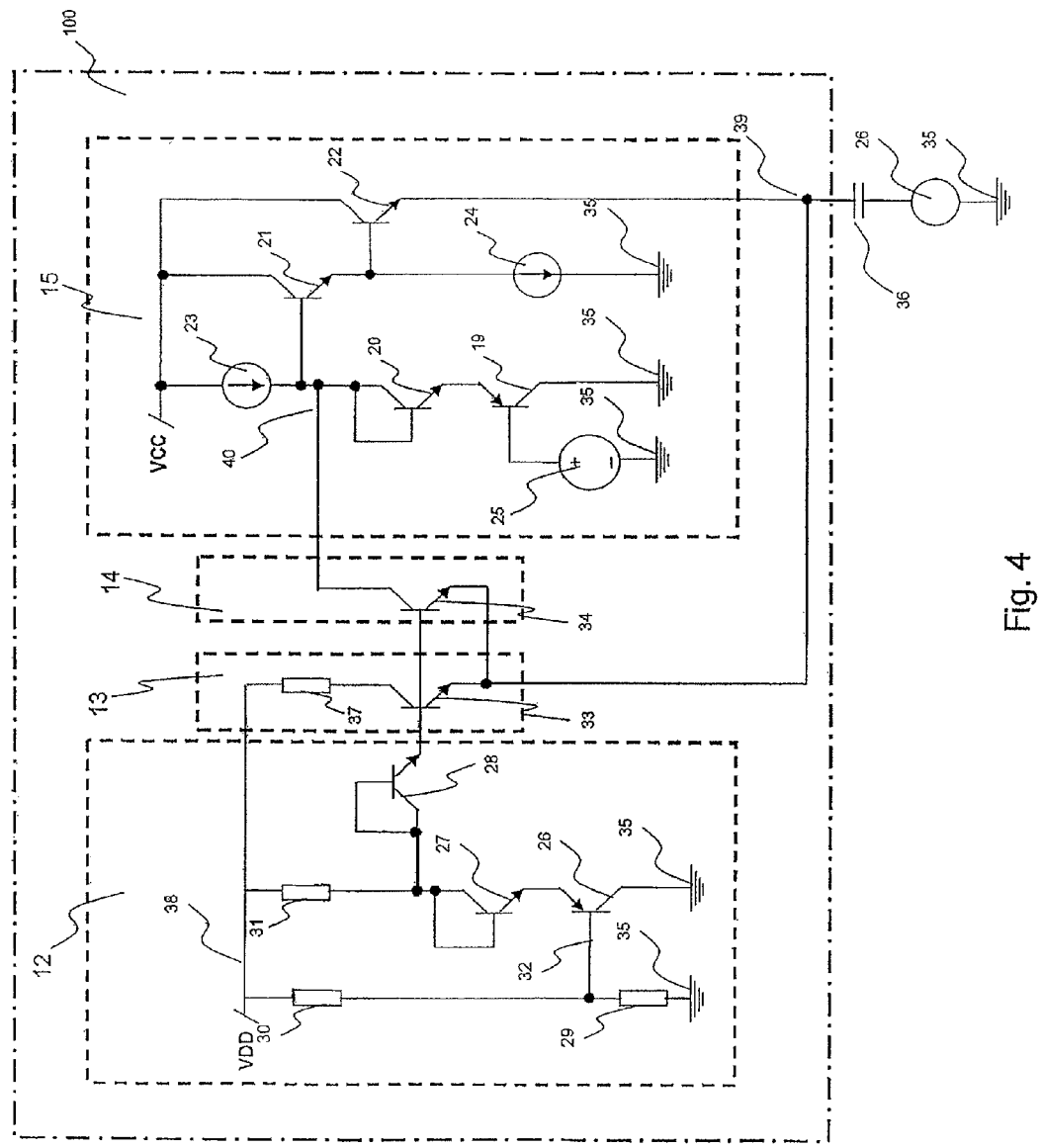
FIG. 4 is a sample of proposed circuit used for implementing system configuration of this invention according to second embodiment.

Referring to FIG. 4, a second embodiment of ground detection circuit 100 for video signal line driver, demonstrating an exemplary implementation of the system as described in embodiment 1 is shown.

Referring to FIG. 4, the combination of transistors 19, 20, 21, 22 and current sources 23 and 24 form an example of an implementation of the video signal line driver circuit 15 as shown in FIG. 3. Current source 23 and transistors 19 and 20 form a level shifter circuit so that voltage level at the base of transistors 21 is 2Vbe above bias voltage 25. Transistor 21 and current source 24 provide sufficient base current for transistor 22. Transistor 22 is a large NPN to provide sufficient current drive to transmit video signal 26 along video signal line 39 at pre-determined DC level. The pre-determined DC level is (Bias voltage 25+Veb of Transistor 19+Vbe of transistor 20−Vbe of transistor 21−Vbe of transistor 22).

Referring to FIG. 4, the combination of transistors 26, 27, 28 and resistors 29, 30, 31 form an example of an implementation of the switching threshold control circuit 12 as shown in FIG. 3. Resistors 29 and 30 form a voltage divider to fix voltage at node 32 at a predetermined value. Resistor 31 and transistors 26, 27 form a level shifter circuit so that voltage level at collector of transistor 28, which is diode connected, is 2Vbe above voltage at node 32.

In brief, switching threshold control circuit 12 shown in FIG. 4 will set the base voltage of transistors 33 and 34 at a pre-determined level, which is (voltage at node 32+Veb of transistor 26+Vbe of transistor 27−Vbe of 28). This pre-determined level will the control switching threshold of large current prevention circuit 14 and start-up time enhancement circuit 13 as described in embodiment 1 (as shown in FIG. 3).

Figure 4A:
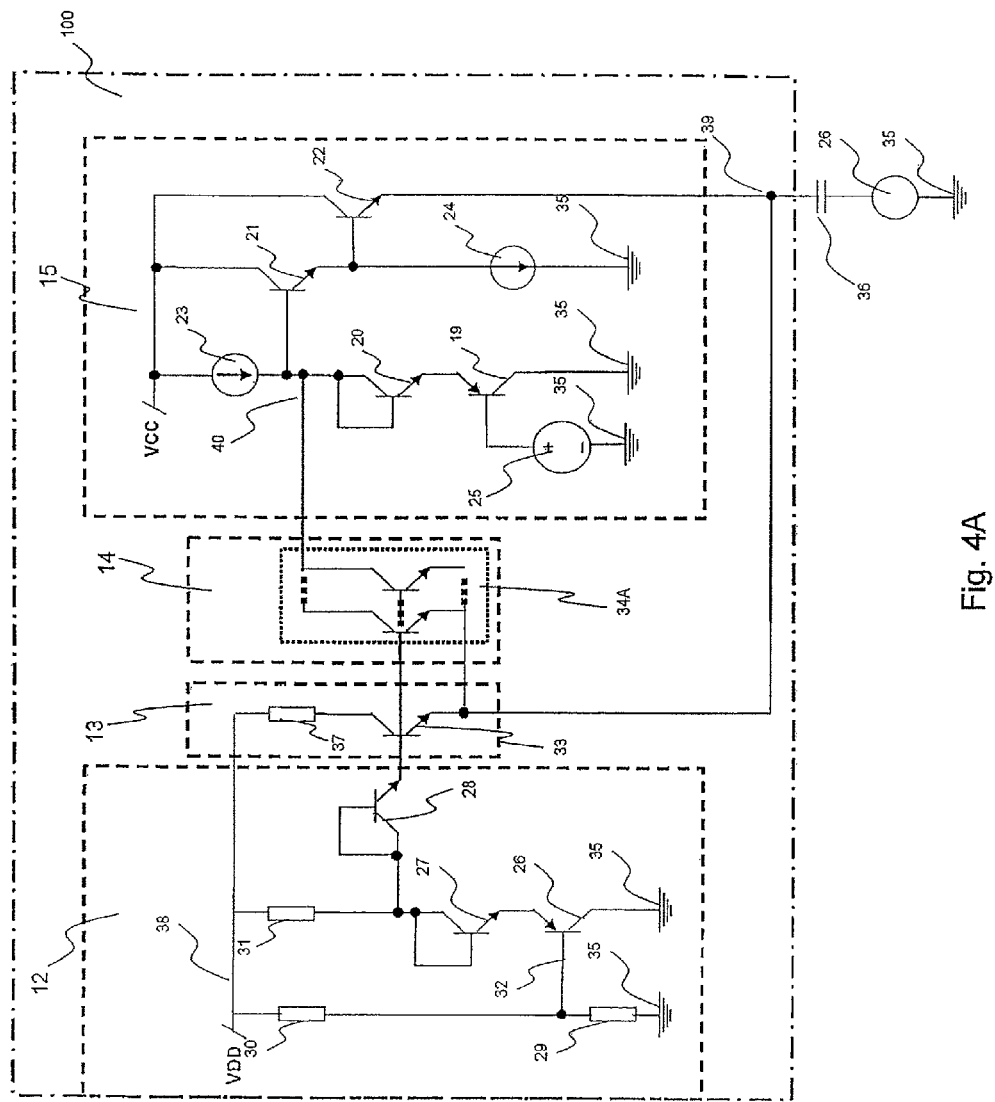
FIG. 4A is a sample of proposed circuit used for implementing system configuration of this invention according to second embodiment using a plurality of transistors for the large current prevention circuit.

Referring to FIG. 4, transistor 34 forms an example of an implementation of the large current prevention circuit 14 as described in embodiment 1. Similarly, the large current prevention circuit 14 may also be implemented by a plurality of transistors 34A arranged in parallel (as shown in FIG. 4A). Emitter of transistor 34 is connected to the video signal line 39. As mentioned above, voltage at the base of transistor 34 is set at a pre-determined value, so that, if video signal line 39 is shorted to ground terminal 35, the large Vbe of transistor 34 will cause a large current to be sourced from node 40. This abnormal condition will cause the transistor 34 to saturate. As collector of transistor 34 is connected to the base of transistor 21, base of transistor 21 will be pulled close to ground level, as a result of transistor 34 being in saturation mode. In this way, both transistor 21 and 22 will be cut-off and therefore no current will flow out from transistor 22 into video signal line 39.

In brief, transistor 34 will detect if the video signal line 39 is shorted to ground terminal 35 by sensing voltage level at video signal line 39 and functions as a switch to cut-off possible large current flowing out from transistor 22 into video signal line 39. Large current prevention circuit 14 will detect video signal line shorted to ground if voltage level at video signal line 39 is lower than switching threshold, as will be explained in the following paragraphs.

The switching threshold is controlled by the pre-determined voltage at the base of transistor 34. This pre-determined voltage is fixed by switching threshold control circuit 12. Referring to FIG. 4, switching threshold is (voltage at node 32+Veb of 26+Vbe of 27−Vbe of 28−Vbe of 34).

We shall now discuss the design considerations in determining the switching threshold.

Case 1: If switching threshold of large current prevention circuit 14 is lower than level of noise at ground terminal 35 when video signal line 39 is shorted to ground terminal 35.

Ground noise may be high enough to cause DC at video signal line 39 exceed switching threshold. In this case, large current prevention circuit 14 will be unable to detect video signal line 39 is being shorted to ground terminal 35 and hence large current from transistor 22 cannot be cut off. This is not desirable.

Case 2: If switching threshold of large current prevention circuit 14 higher than minimum instantaneous voltage level at video signal line 39 when connected to video source 26 through AC coupling capacitor 36.

Transistor 34 will cut-off the current flow out from transistor 22 into video signal line 39. This may cause the distortion in video signal at video signal line 39. It is also not desirable.

In brief, the switching threshold of large current prevention circuit 14 needs to be designed:
 a) higher than the level of noise at ground terminal 35; and
 b) lower than the minimum instantaneous voltage level at video signal line 39 when connected to video source 26 through AC coupling capacitor 36.

During start-up, AC coupling cap 36 is usually fully discharged. DC level at video signal line 39 may be lower than switching threshold of large current prevention circuit 14 shown in FIG. 4. Hence, current source out from transistor 22 into video signal line 39 will be cut off.

In this case, charging current for AC coupling cap 36 during start up will flow out from large current prevention circuit 14 shown in FIG. 4. Sometimes, magnitude of charging current sources out from large current prevention circuit 14 may be limited by its design. This may cause slow start-up time.

Figure 4B:
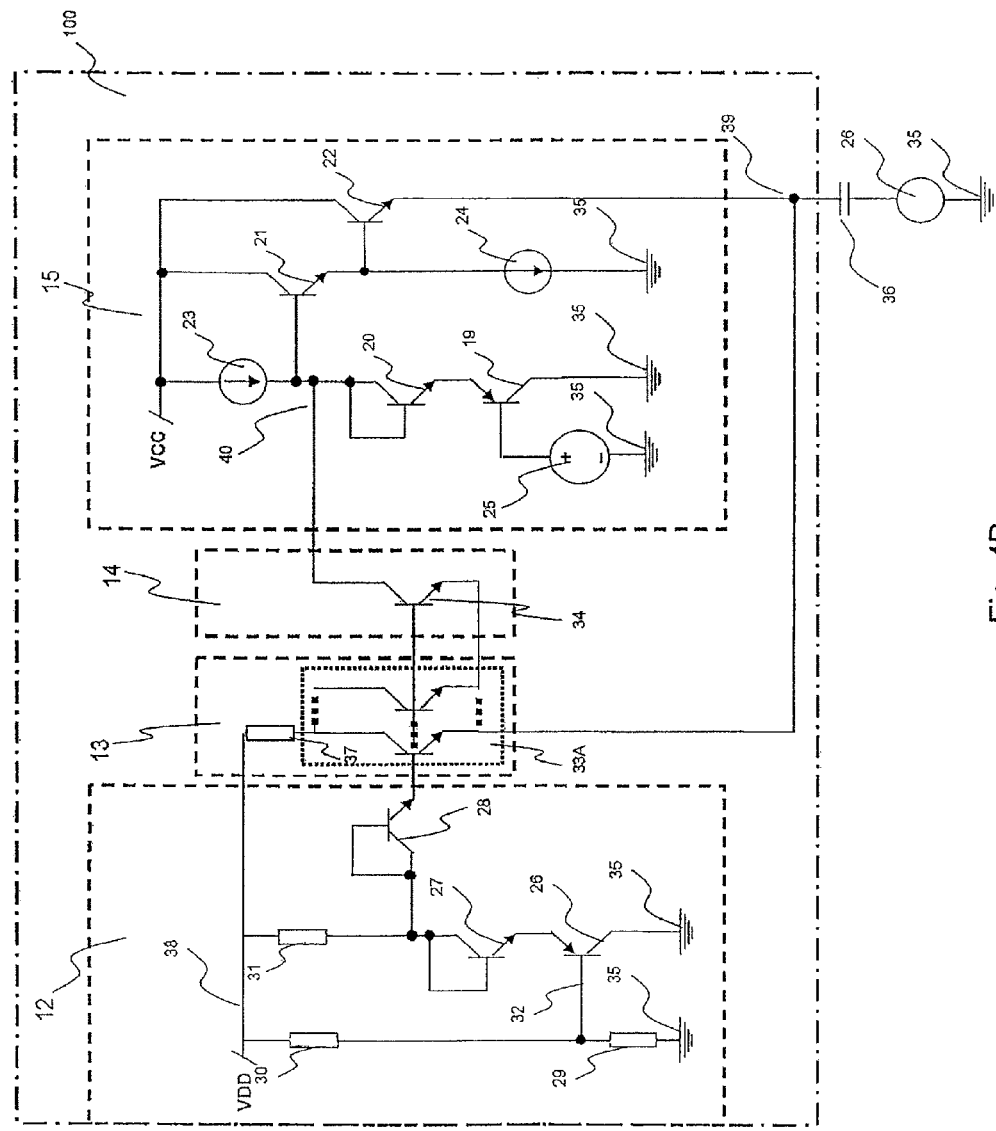
FIG. 4B is a sample of proposed circuit used for implementing system configuration of this invention according to second embodiment using a plurality of transistors for the startup time enhancement circuit.

Referring to FIG. 4, transistor 33 and resistor 37 form an example of an implementation of the start-up time enhancement circuit 13 as described in embodiment 1. Similarly, a plurality of transistors 33A arranged in parallel in place of the single transistor 33 may be implemented (as shown in FIG. 4B). Start-up time enhancement circuit 13 is added to source additional charging current to AC coupling capacitor 36. In this way, the start-up time can be improved. Start-up time enhancement circuit 13 will continuously source additional current to charge up AC coupling capacitor 36 until voltage level at video signal line 39 exceed switching threshold of start-up time enhancement circuit 13.

The switching threshold of start-up time enhancement circuit 13 shown in FIG. 4 controlled by pre-determined voltage at the base of transistor 33. This pre-determined voltage is fixed by switching threshold control circuit 12. Refer to FIG. 4, switching threshold of start-up time enhancement circuit 13 is (voltage at node 32+Veb of transistor 26+Vbe of transistor 27−Vbe of transistor 28−Vbe of transistor 33).

During initial start-up, total current source out from large current prevention circuit 14 and start-up time enhancement circuit 13 to charge up AC coupling capacitor 36 is [current source 23 +(VDD 38−voltage level at video signal line 39−Saturation Vce of transistor 33)/resistance of 37].

Third Embodiment

Figure 5:
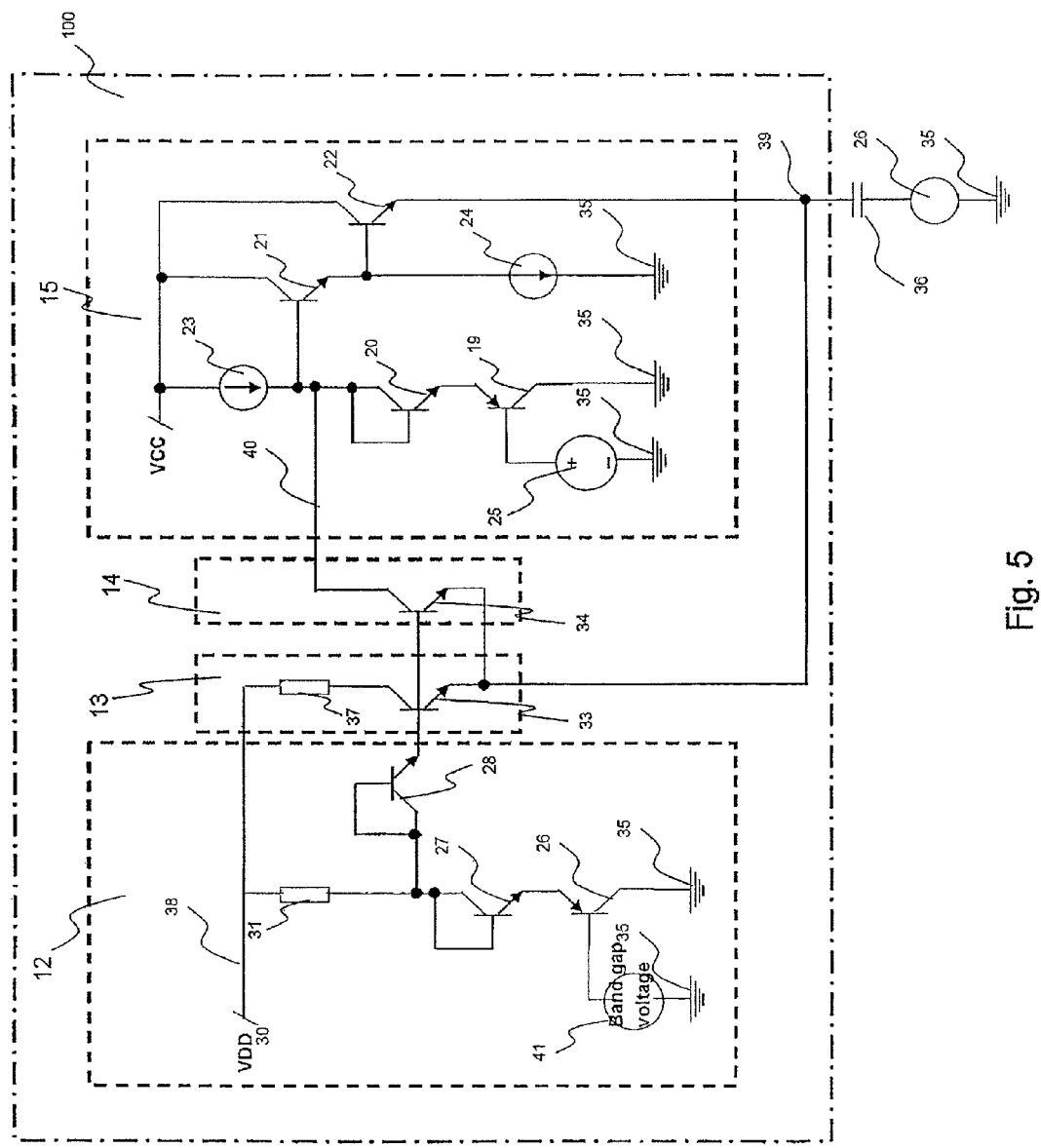
FIG. 5 is a sample of proposed circuit used for implementing system configuration of this invention according to third embodiment.

Referring to FIG. 5, a third embodiment of ground detection circuit 100 for video signal line driver, demonstrating another exemplary implementation of the system as described in embodiment 1 is shown.

The only difference between circuit shown in FIGS. 4 and 5 is that a band gap voltage source 41 is connected to base of transistor 26, as shown in FIG. 5. On the other hand, in FIG. 4, base of transistor 26 is connected to a pre-determined DC fixed by voltage divider, which is formed by resistors 29 and 30.

Referring to FIG. 5, and as previously described in embodiment 2, similarly, switching threshold control circuit 12 will set the voltage at the base of transistor 33 and 34 at a pre-determined value. This pre-determined level will control switching threshold of large current prevention circuit 14 and start-up time enhancement circuit 13.

The purpose of connecting band gap voltage source 41 to base of transistor 26 as shown circuit in FIG. 5 is to reduce temperature dependency of the pre-determined value of the voltage at the base of transistor 33 and 34. In such arrangement, the temperature dependency of switching threshold of large current prevention circuit 14 and start-up time enhancement circuit 13 shown in FIG. 5 will also be reduced.

Having described the above embodiment of the invention, various alternations, modifications or improvement could be made by those skilled in the art. Such alternations, modifications or improvement are intended to be within the spirit and scope of this invention. The above description is by ways of example only, and is not intended as limiting. The invention is only limited as defined in the following claims.

What is claimed is:

1. A system for prevention of a large current flowing out from a video signal line driver into a video signal line, when the video signal line is shorted to ground, comprising:
 a video signal line driver circuit that transmits a video signal at a first pre-determined DC level;
 a large current prevention circuit that detects the video signal line shorted to ground and a cut-off excessive current source out from the video signal line driver circuit into the video signal line;
 a start-up time enhancement circuit that improves a start-up time of a ground detection circuit so that a system start-up time is not limited by said large current prevention circuit; and
 a switching threshold control circuit that sets a switching threshold of said large current prevention circuit and said start-up time enhancement circuit.

2. The system according to claim 1, wherein said switching threshold control circuit outputs a second pre-determined DC level to said large current prevention circuit and said start-up time enhancement circuit.

3. The system according to claim 2, wherein said second pre-determined DC level controls said switching threshold of said large current prevention circuit and said start-up time enhancement circuit.

4. The system according to claim 1, wherein said large current prevention circuit includes at least one transistor which detects a DC level at the video signal line.

5. The system according to claim 4, wherein when said DC level at the video signal line detected by said large current prevention circuit is lower than said switching threshold, said large current prevention circuit cuts-off said at least one transistor which supplies a current drive to the video signal line to transmit the video signal at said first pre-determined DC level.

6. The system according to claim 5, wherein said switching threshold of said large current prevention circuit is designed to be higher than a level of a ground noise and lower than a minimum instantaneous voltage level at the video signal line when connected to the video signal through an AC coupling capacitor.

7. The system according to claim 1, wherein said start-up time enhancement circuit includes at least one transistor that supplies an additional current to charge up an AC coupling capacitor during an initial startup.

8. The system according to claim 7, wherein said start-up time enhancement circuit supplies an additional current until a voltage level at the video signal line exceeds a switching threshold of said start-up time enhancement circuit.

9. A method for prevention of a large current flowing out from a video signal line driver into a video signal line when the video signal line is shorted to ground, comprising:
 sensing a DC level at the video signal line;
 determining whether a DC level at the video signal line is less than a first pre-determined switching threshold; and
 cutting off a transistor which sources a large current when the video signal line is shorted to ground.

10. A method according to claim 9, wherein the cutting off a transistor further comprises:
 improving a start-up time by supplying an additional charging current for an AC coupling capacitor during an initial start-up until the voltage level at the video signal line exceeds a second pre-determined switching threshold.

11. A method according to claim 9, wherein the first pre-determined switching threshold is higher than a level of a ground noise and lower than a minimum instantaneous voltage level at the video signal line when connected to the video signal through an AC coupling capacitor.

\* \* \* \* \*